United States Patent [19]

Weidner et al.

[11] Patent Number: 5,861,457
[45] Date of Patent: *Jan. 19, 1999

[54] ORGANOPOLYSILOXANE RESIN SOLUTIONS, PROCESSES FOR THEIR PREPARATION, AND THEIR USE IN COATING COMPOSITIONS

[75] Inventors: Richard Weidner, Burghausen; Friedrich Hockemeyer, Marktl; Volker Frey, Burghausen; Reinhardt Müller, Burghausen; Hartmut Jahn, Burhghausen, all of Germany

[73] Assignee: Wacker-Chemie GmbH, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 698,607

[22] Filed: Aug. 16, 1996

Related U.S. Application Data

[62] Division of Ser. No. 520,331, Aug. 29, 1995, abandoned.

[30] Foreign Application Priority Data

Oct. 14, 1994 [DE] Germany ............................ 44 36 817.8

[51] Int. Cl.$^6$ ...................................................... C08G 77/08
[52] U.S. Cl. .............................. 524/588; 528/15; 525/478; 525/479
[58] Field of Search ...................................... 525/478, 479; 524/588; 528/15

[56] References Cited

U.S. PATENT DOCUMENTS

| 4,526,953 | 7/1985 | Dallavia, Jr. ............................... 528/15 |
| 4,623,700 | 11/1986 | Traver et al. ............................ 525/478 |
| 4,830,924 | 5/1989 | Dallavia, Jr. ............................ 428/429 |
| 5,446,087 | 8/1995 | Chizat et al. ............................ 524/588 |
| 5,629,387 | 5/1997 | Frances et al. .......................... 525/478 |
| 5,696,211 | 12/1997 | Chung et al. ............................ 525/478 |

FOREIGN PATENT DOCUMENTS 108 208   5/1984   European Pat. Off. .

*Primary Examiner*—Margaret W. Glass
*Attorney, Agent, or Firm*—Brooks & Kushman P.C.

[57] ABSTRACT

The present invention relates to organopolysiloxane resin solutions which contain 1-alkenes and are free from aromatic hydrocarbons, processes for their preparation and their use in organopolysiloxane compositions from which it is possible to produce coatings which repel tacky substances.

9 Claims, No Drawings

ORGANOPOLYSILOXANE RESIN SOLUTIONS, PROCESSES FOR THEIR PREPARATION, AND THEIR USE IN COATING COMPOSITIONS

The application is a division of application Ser. No. 08/520,331, filed on Aug. 29, 1995, abandoned.

FIELD OF INVENTION

The present invention relates to organopolysiloxane resin solutions which are free from aromatic hydrocarbons and contain 1-alkenes, to processes for their preparation, and to their use in coating compositions.

BACKGROUND OF INVENTION

Organopolysiloxane resins and processes for their preparation are known from numerous references. EP 195 936 A (Toray Silicone Co., Ltd.; published on Oct. 1, 1986) describes a process for the preparation of MQ resins by hydrolysis of alkyl silicate with a monofunctional silane, where the reaction mixture contains at least 5% by weight of hydrogen chloride and the alkyl silicate is slowly added dropwise as the last component. DE 42 16 139 A (Wacker-Chemie GmbH: published on Nov. 18, 1993) describes a process for the preparation of organopolysiloxane resins by acid hydrolysis of silanes or partial hydrolysates thereof and basic after treatment in the presence of water-insoluble organic solvent, especially toluene, which acts as a entraining agent in the simultaneous distillation of water and alcohol. The removal of water and alcohol is particularly important for the preparation of silicone resin having a low content of Si-bonded hydroxyl and alkoxy groups.

Coating compositions which comprise aliphatically unsaturated hydrocarbons have also been disclosed. EP 108 208 B1 (General Electric Co.; published on Apr. 27, 1988) and EP 216 376 A1 (General Electric Co.; published on Apr. 1, 1987) describe release coating compositions for the self-adhesive sector which contain, among other components, reactive, low-viscosity diluents, such as α-olefns. The crosslinking of the coating composition takes place primarily by way of a platinum-catalyzed addition reaction. The reactive diluent is introduced into the coating system via a release additive. These release additives, making it is possible to adjust the release properties of the coating system, are silicone resins, essentially MQ resins, which are prepared by mixing a solution of the silicone resin in toluene or xylene with the reactive, higher-boiling diluent and then removing the aromatic solvent by distillation at temperatures as low as possible. Such coating compositions generally contain aromatic solvent, which leads to emissions when they are processed.

SUMMARY OF INVENTION

The present invention provides organopolysiloxane resin solutions which comprise 1-alkenes having 10 to 14 carbon atoms and are free from aromatic hydrocarbons.

In the context of the present invention, the term organopolysiloxanes is understood as including oligomeric siloxanes.

The organopolysiloxane resin solutions according to the invention have a content of preferably from 50% to 90% by weight, more preferably from 60% to 85% by weight of the organopolysiloxane resin.

The organopolysiloxane resin solutions according to the invention have a viscosity at 25° C. of preferably from 3 to 10,000 mm$^2$/s, more preferably from 50 to 3000 mm$^2$/s.

The organopolysiloxane resin solutions according to the invention are preferably free from hydrocarbons other than 1-alkenes having 10 to 14 carbon atoms.

The present invention also provides a process for the preparation of organopolysiloxane resin solutions which are free from aromatic hydrocarbons, which comprises in a 1st stage reacting at least one silane of formula $$R_3SiOR^1 \quad (I)$$

and/or its hydrolysate $R_3SiOSiR_3$, where
R is identical or different and is a monovalent organic radical and
$R^1$ is an alkyl radical,
and at least one silane of formula $$Si(OR^2)_4 \quad (II)$$

and/or its partial hydrolysate, where
$R^2$ is identical or different and is an alkyl radical,
and, optionally, organosilicon compounds selected from the group consisting of silanes of formula $$R^3{}_a Si(OR^4)_{4-a} \quad (III)$$

and/or partial hydrolysate thereof, where
a is 1 or 2,
$R^3$ is identical or different and is a monovalent organic radical, and
$R^4$ is identical or different and is an alkyl radical, and organopolysiloxanes of formula $$(R^5{}_2SiO)_b \quad (IV),$$

where
$R^5$ is identical or different and is a monovalent organic radical and
b is an integer from 3 to 8, preferably 4 or 5, and mixtures thereof, with water in the presence of acid, with at least some of the alcohol formed being removed by distillation yielding a homogeneous reaction mass, in a 2nd stage reacting the homogeneous reaction mass obtained in the 1st stage in the presence of base and of a quantity of terminally unsaturated aliphatic hydrocarbon which is sufficient to obtain a homogeneous reaction mass, and removing water and alcohol by distillation in a 3rd stage neutralizing the homogeneous reaction mass obtained in the 2nd stage with acid, distilling off partially any terminally unsaturated aliphatic hydrocarbon and distilling off completely any water which is still present and alcohol, and removing the precipitated salt arising from the neutralization, and optionally, in a 4th stage, partially freeing the homogeneous reaction mass obtained in the 3rd stage from terminally unsaturated aliphatic hydrocarbon.

The radicals R, $R^3$ and $R^5$ are independent of one another and are preferably monovalent hydrocarbon radicals having 1 to 18 carbon atoms.

Examples of the radicals R, $R^3$ and $R^5$, are alkyl radicals such as the methyl, ethyl, n-propyl, isopropyl, n-butyl, isobutyl, tert-butyl, n-pentyl, isopentyl, neopentyl and tert-pentyl radical, hexyl radicals such as the n-hexyl radical, heptyl radicals such as the n-heptyl radical, octyl radical such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl, allyl, n-5-hexenyl, 4-vinylcyclohexyl and 3-norbornenyl radical; cycloalkyl radicals, such as cyclopentyl, cyclohexyl, 4-ethylcyclohexyl, and cycloheptyl radicals, norbornyl radicals and methylcyclohexyl radicals; aryl radicals, such as the phenyl, biphenylyl, naphthyl, anthryl and phenanthryl radical; alkaryl radicals, such as o-, m- and p-tolyl radicals, xylyl radicals and ethylphenyl radicals; and aralkyl radicals, such as the benzyl radical and the α- and β-phenylethyl radical.

Examples of substituted hydrocarbon radicals as the radical R, R³ or R⁵, are halogenated hydrocarbon radicals, such as the chloromethyl, 3-chloropropyl, 3-bromopropyl, 3,3,3-trifluoropropyl and 5,5,5,4,4,3,3-heptafluoropentyl radical, and the chlorophenyl, dichlorophenyl and trifluorotolyl radical; acyloxyalkyl radicals, such as the 3-acryloyloxypropyl and 3-methacryloyloxypropyl radical; hydroxyalkyl radicals, such as the hydroxypropyl radical, and radicals of the formula

The radicals R, R³ and R⁵, comprise with particular preference the methyl and vinyl radicals.

Examples of the radicals $R^1$, $R^2$ and $R^4$, are the examples of alkyl radicals given for R, $R^3$ and $R^5$.

The radicals $R^1$, $R^2$ and $R^4$ are, preferably alkyl groups having 1 to 4 carbon atoms.

The radicals $R^1$, $R^2$ and $R^4$, comprise with particular preference the methyl and ethyl radical.

In the process according to the invention, it is preferred to employ silanes of the formulae (I), (II) and, optionally (III) and/or (partial) hydrolysates thereof in which $R^1$, $R^2$ and $R^4$ have the identical meaning.

If, in the process according to the invention, partial hydrolysates of silanes of formulae (II) and (III) are employed, then preference is given to those having up to 15 silicon atoms.

Examples of the silanes of formula (I) and/or their hydrolysates, i.e., disiloxanes, employed in the process according to the invention are trimethylethoxysilane, vinyldimethylethoxysilane, hexamethyldisiloxane, 1,3-diphenyltetramethyldisiloxane, 1,3-bis(allyl)tetramethyldisiloxane and 1,3-divinyltetramethyldisiloxane, with particular preference being given to hexamethyldisiloxane and 1,3-divinyltetramethyldisiloxane.

Examples of the silanes of formula (II) employed in the process according to the invention are tetramethoxysilane, tetraethoxysilane and tetra-n-propoxysilane, with particular preference being given to tetraethoxysilane and its partial hydrolysate.

Examples of the silanes of formula (III) employed optionally in the process according to the invention are methyltrimethoxysilane, vinyltrimethoxysilane, 3-chloropropyltrimethoxysilane, phenyltrirethoxysilane, o-, m- and p-tolyltrimethoxysilane, propyltrimethoxysilane, methyltriethoxysilane, vinyltriethoxysilane, 3-chloropropyltriethoxysilane, phenyltriethoxysilane, o-, m- and p-tolyltriethoxysilane, propyltrimethoxysilane, dimethyldiethoxysilane, and dimethyldimethoxysilane, with preference being given to employing methyltrimethoxysilane, methyltriethoxysilane, phenyltriethoxysilane, o-, m- and p-tolyltriethoxysilane and propyltriethoxysilane.

Examples of the organopolysiloxanes of formula (IV) employed, optionally, in the process according to the invention are hexamethylcyclotri siloxane, octamethylcyclotetrasiloxane and decamethylcyclopentasiloxane, with preference being given to octamethylcyclotetrasiloxane and decamethylcyclopentasiloxare.

If the silane of formula (III) and/or its partial hydrolysate and/or organopolysiloxane of formula (IV) is employed, they are employed in quantiies of preferably up to 15% by weight, based on the overall weight of the silicon compounds.

The use of silane of formula (III) and/or its partial hydrolysate and organopolysiloxane of formula (IV) is not preferred in the process according to the invention.

In the 1 st stage of the process it is preferred to employ a mixture of silanes of formula (I) and/or a hydrolysate thereof, especially one where R is methyl or vinyl radical, and silane of formula (II) and/or its hydrolysate in a molar ratio, based on Si units, which is preferably from 0.4:1 to 2.0:1, more preferably from 0.5:1 to 1.5:1, where $R^1$ in formula (I) has the same meaning as $R^2$ in formula (II).

In the 1st stage of the process, water and acid are added to a mixture of silane in formula (I) and/or its hydrolysate, silane in formula (II) and/or its partial hydrolysate and, optionally, organosilicon compound of formula (III) and/or its partial hydrolysate of formula (IV), and the components are mixed.

In this 1st stage of the process, water is employed in quantities of preferably from 5% to 30% by weight, more preferably from 5% to 20% by weight, in particular from 8% to 18% by weight, based on the overall weight of the reaction mass of the 1st stage prior to distillation.

The acids employed in the 1st stage of the process according to the invention may be the same acids which have been used previously for the hydrolysis of silanes with alkoxy groups. Examples of such acids are inorganic acids, such as HCl, $HClO_4$, $H_2SO_4$ and $H_3PO_4$, and organic acids, such as acetic acid, formic acid, propionic acid, methanesulfonic acid and trifluoromethanesulfonic acid, with preference given to employing HCl.

In order to obtain a homogeneous reaction mass, in the 1st stage of the process according to the invention acid is employed in quantities of preferably from 0.2 to 50 mmol, more preferably from 2.5 to 15 mmol, based on 1000 g of the reaction mass of the 1st stage prior to distillation. In general, at higher concentrations of acid, no homogeneity of the reaction mass is obtained. For example, when using the more preferred HCl as the acid, a concentration range of from 100 to 500 ppm, based on the overall weight of the reaction mass of the 1st stage prior to distillation, has been found to be advantageous.

The alcohol which is formed during the hydrolysis in the 1st stage of the process according to the invention is wholly or partially removed during or after the hydrolysis, in particular after the hydrolysis. Depending on the nature of the alcohol and/or on the quantity of water employed, the distillate may contain certain amounts of water. Preferably, the alcohol is distilled off after the hydrolysis to the extent that the reaction mass remains homogeneous.

It is more preferred to remove by distillation from 50% to 90% by weight of alcohol, based on the overall weight of alcohol produced.

The 1st stage of the process is preferably carried out at a temperature of from 20° C. to the boiling temperature of the reaction mass, more preferably from 50° C. to the boiling temperature of the reaction mass, and at a pressure of between preferably 900 and 1100 hPa.

The 1st stage of the process is completed after preferably from 30 minutes to 5 hours, more preferably from 1 to 3 hours.

After the end of the 1st stage of the process, base is added in a quantity which is at least that required to obtain a basic reaction mass. In addition the terminally unsaturated aliphatic hydrocarbons as well as optional further substances are added. The quantities of base involved, depending on the base employed, are generally in the range from 0.02% to 2.0% by weight, based on the overall weight of the reaction mass from the 2nd stage prior to distillation.

The quantity of base added in the 2nd stage is preferably such that the pH is in the range of from 8.0 to 14.0., preferably from 9.0 to 12.0.

Bases which can be employed in the 2nd stage of the process according to the invention are all bases which have been employed as catalysts in condensation reactions.

Examples of such bases are alkali metal hydroxides, such as sodium hydroxide and potassium hydroxide, alkali metal siliconates, such a sodium siliconate and potassium siliconate, amines, for example methylamine, dimethylamine, ethylamine, diethylamine, triethylamine and n-butylamine, ammnoium compounds, for instance tetramethylammonium hydroxide and tetra-n-butylammonium hydroxide, with preference being given to sodium hydroxide, potassium hydroxide, methylamine, ethylamine and diethylamine and particular preference to sodium hydroxide, potassium hydroxide and methylamine.

The terminally unsaturated aliphatic hydrocarbons employed in accordance with the invention are preferably 1-alkenes having 10 to 18 carbon atoms such as 1-decene, 1-dodecene, l-tetradecene and 1-hexadecene, with particular preference being given to 1-alkenes having 10 to 14 carbon atoms, in particular 1-dodecene and 1-tetradecene.

The terminally unsaturated aliphatic hydrocarbon which is employed in the 2nd stage of the process according to the invention is used in a quantity which is at least sufficient to obtain a homogeneous reaction mass. Preferably quantities of up to 50% by weight, more preferably up to 40% by weight, of terminally unsaturated aliphatic hydrocarbon, based on the overall weight of the reaction mass from the 2nd stage prior to distillation are added. The parts of terminally unsaturated aliphatic hydrocarbon which are added should equal the volume of alcohol and, optionally, water distilled off in the 1st stage.

In the distillation carried out in the 2nd stage of the process, the water present in the reaction mixture and the residual alcohol are distilled off completely or almost completely, and, optionally, small quantities of terminally unsaturated aliphatic hydrocarbon are distilled off along with them.

The distillation which is carried out in the 2nd stage of the process is advantageously commenced immediately after the addition of base. The distillation is necessary in order to obtain an organopolysiloxane resin which is free from alkoxy and/or hydroxyl groups, or an organopolysiloxane resin with a low alkoxy and/or hydroxyl content.

When the base is added in the 2nd stage to the acid reaction mass of the 1st stage, small quantities of a salt are formed which may precipitate out after the distillation in the 2nd stage. In the context of the present invention, however, the possibly precipitated salt should be disregarded with respect to the concept of the homogeneous reaction mass in the 2nd stage.

The 2nd stage of the process is preferably carried out at the boiling temperature of the reaction mass and at a pressure of between 900 and 1100 hPa.

The 2nd stage of the process is completed after preferably from 0.5 to 5 hours, more preferably from 1 to 3 hours.

After the end of the 2nd stage of the process, the homogeneous reaction mixture is neutralized in a 3rd stage with acid, any water still present and alcohol are distilled off completely, and the precipitated salt is removed. In this process stage it is also possible, optionally, to distill off some terminally unsaturated aliphatic hydrocarbon. The distillation in the 3rd stage of the process is preferably carried out at a pressure of from 5 to 1100 hPa and at a temperature of from 80° to 180° C.

Suitable acids for the neutralization in the 3rd stage are all acids mentioned in the 1st stage, with preference being given to the use of the same acid as in the 1st stage.

If acids diluted with water are used for the neutralization in the 3rd stage of the process and/or the distillation in the 2nd stage was not carried out to completion, it is necessary in the 3rd stage to distill off water, and after the distillation the salt present in the reaction mass precipitates completely.

The precipitated salt is then removed from the reaction mixture, preferably by filtration.

After the end of the 3rd stage of the process, it is possible, optionally, in a 4th stage to free the homogeneous reaction mass obtained from some terminally unsaturated aliphatic hydrocarbon, preferably by distillation, which is carried out preferably at a pressure of from 5 to 1100 hPa and at a temperature of from 100° to 180° C.

According to a preferred embodiment of the process, hexamethyldisiloxane and/or timethylethoxysilane, if desired in a mixture with 1,3-di-vinyltetramethyldisiloxane and/or vinyldimethylethoxysilane and tetraethoxysilane and/or its partial hydrolysate in a 1st stage is mixed with water and from 0.2 to 50 mmol of acid, based on 1000 g of the reaction mass from the 1st stage prior to distillation, the components are reacted at the boiling temperature of the reaction mass and at a pressure of between 900 and 1100 hPa, and ethanol formed is distilled off, in a 2nd stage the homogeneous reaction mass obtained in the 1st stage is reacted in the presence of base selected from the group consisting of sodium hydroxide, potassium hydroxide and methylamine, and a terminally unsaturated aliphatic hydrocarbon, in particular a 1-alkene having 10 to 18 carbon atoms, at the boiling temperature of the reaction mass and at a pressure of between 900 and 1100 hPa, with water and ethanol being distilled off completely or almost completely, in a 3rd stage the homogeneous reaction mass obtained in the 2nd stage is neutralized with acid. Any water and ethanol are distilled off completely, and any terminally unsaturated aliphatic hydrocarbon is distilled off partially, and the precipitated salt formed in the neutralization is filtered off, and, optionally, in a 4th stage the reaction mass obtained in the 3rd stage is freed from some terminally unsaturated aliphatic hydrocarbon by distillation.

According to a more preferred embodiment of the process according to the invention, hexamethyldisiloxane and/or trinmethylethoxysilane, optionally in a mixture with 1,3-divinyltetramethyldisiloxane and/or vinyldimethylethoxysilane and tetraethoxysilane and/or its partial hydrolysate in a 1st stage is mixed with water and from 100 to 500 ppm of HCl, based on the overall weight of the reaction mass from the 1st stage prior to distillation, the components are reacted at the boiling temperature of the reaction mass and at a pressure of between 900 and 1100 hPa, and about 70% by weight of the ethanol produced, based on the total quantity of ethanol produced, is distilled off, in a 2nd stage the homogeneous reaction mass obtained in the 1st stage is reacted in the presence of base selected from the group consisting of sodium hydroxide, potassium hydroxide and methylamine, and 1-alkene having 10 to 18 carbon atoms, in particular 1-dodecene or 1-tetradecene, at the boiling temperature of the reaction mass and at a pressure of between 900 and 1100 hPa, with water and ethanol being distilled off completely or almost completely, in a 3rd stage the homogeneous reaction mass obtained in the 2nd stage is neutralied with HCl, water and any ethanol are distilled off completely, and 1-alkene is distilled off partially, and the precipitated salt formed in the neutralization is filtered off, and, optionally, in a 4th stage the reaction mass obtained in the 3rd stage is freed from some terminally unsaturated aliphatic hydrocarbon by distillation.

The resin solutions prepared in accordance with the invention have a content of organopolysiloxane resin of preferably from 50% to 90% by weight, more preferably from 60% to 85% by weight.

The organopolysiloxane resin in the organopolysiloxane resin solutions according to the invention has an average molecular weight of preferably from 500 to 10,000 g/mole (determined by gel permeation chromatography) and has on average 0, or at most up to 6, mol percent, of alkoxy groups, relative to tetrafunctional Si units ($SiO_{4/2}$), and 0 or at most 0.4% by weight of Si-bonded hydroxyl groups, based on the overall weight of organopolysiloxane resin. The organopolysiloxane resin solutions and the organopolysiloxane resin they comprise are entirely compatible with organopolysiloxanes, with the organopolysiloxane resin being at least partially, but preferably completely, soluble in liquid organopolysiloxane.

Examples of the organopolysiloxane resins present in the organopolysiloxane resin solutions according to the invention are $[Me_3SiO_{1/2}]_x[SiO_{4/2}]_y$, where Me is methyl radical and the ratio of x to y is from 0.5: 1 to 1.5: 1, and $[Me_3SiO_{1/2}]_x[Me_2ViSiO_{1/2}]_y[SiO_{4/2}]_z$ where Me is methyl radical, Vi is vinyl radical and the ratio of (x+y) to z is from 0.5:1 to 1.5:1 and the ratio of x to y is from 98.2 to 50:50.

The process according to the invention has the advantage that it is very simple to carry out, is very reproducible and gives high space-time yields. A great advantage which has become evident is that the terminally unsaturated aliphatic hydrocarbon employed in accordance with the invention is not subject to any chemical alterations, and in particular is not subject to any isomerization and thus migration of the terminal carbon-carbon double bond, which is a very important factor for use in coating compositions for the self-adhesive sector (short crosslinking times) in order to obtain reproducible release values. The terminally unsaturated aliphatic hydrocarbon obtained in some cases can be recycled into the process. A further advantage is that in the process according to the invention there is no liquid/liquid phase separation, and therefore no losses in yield occur.

The organopolysiloxane resin solutions prepared in accordance with the invention have the advantage that they are highly stable and show no changes in viscosity over a period of at least one year at 25° C. and at the pressure of the surrounding atmosphere.

Owing to the homogeneous reaction medium and the low acid concentration, a resin is formed which has only a small proportion of low molecular weight resin fractions, a fact which has advantageous consequences when the resin is employed in release coating compositions.

In accordance with the process of the invention, organopolysiloxane resin solutions are obtained with a great purity and no Si-bonded alkoxy and/or hydroxyl groups or a low content of alkoxy and/or hydroxyl groups, and these solutions possess a high degree of stability on storage.

The organopolysiloxane resin solutions according to the invention are suitable for all applications for which it has been possible to employ organopolysiloxane resins and/or their solutions, in particular of course for applications in which the presence of even small quantities of aromatic hydrocarbons, such as toluene, is undesirable.

The organopolysiloxane resin solutions according to the invention are used preferably in organopolysiloxane compositions which are crosslinkable by addition of Si-bonded hydrogen onto aliphatic carbon-carbon double bond, and from which compositions it is possible to produce coatings which repel tacky substances.

The present invention additionally provides crosslinkable organopolysiloxane compositions which comprise
(A) organopolysiloxane with SiC-bonded organic radicals containing terminal aliphatic carbon-carbon double bond,
(B) organopolysiloxane containing Si-bonded hydrogen,
(C) organopolysiloxane resin solution,
(D) metal complex or metal compound of subgroup VIII and, optionally,
(E) compounds which delay the addition of Si-bonded hydrogen onto aliphatic double bond.

Components (A), (B), (D) and (E) may be the same ones which have been employed in compositions which are crosslinkable by addition of Si-bonded hydrogen onto aliphatic carbon-carbon double bond.

The organopolysiloxanes (A) are preferably those comprising units of the formula

where
$R^6$ is identical or different and is an aliphatically saturated, unsubstituted or substituted SiC-bonded hydrocarbon radicals having 1 to 18 carbon atoms,
$R^7$ is identical or different and is an SiC-bonded organic radical with terminal aliphatic carbon-carbon double bond,
e is 0, 1, 2 or 3, and
f is 0, 1, 2 or 3,
with the proviso that the sum of e+f is less than or equal to 3 and siloxane (A) has on average per molecule at least two radicals $R^7$.

Although not expressed by formula (V), up to 5% of the radicals $R^6$ in the organopolysiloxane (A) may also have the meaning of alkoxy radical.

Preferably, at least 90% of all the SiC-bonded radicals of organopolysiloxane (A) are methyl radicals.

Examples of radicals $R^6$ are the examples of aliphatically saturated radicals given above for R.

Examples of radical $R^7$ are the vinyl, allyl, 3-butenyl, 5-hexenyl, 7-octenyl and 9-decenyl radical, with more preference being given to the vinyl and 5-hexenyl radical.

The organopolysiloxane (A) employed in accordance with the invention preferably contains on average per molecule two organic radicals with terminal aliphatic carbon-carbon double bond.

It is more preferred for siloxane (A) to comprise polydimethylsiloxanes having dimethylvinyl end groups.

The organopolysiloxanes (A) employed in accordance with the invention have a viscosity at 25° C. which is preferably from 20 to 5000 mm²/s.

The organopolysiloxanes (A) employed in accordance with the invention have iodine numbers which are preferably between 1 and 30, more preferably from 2 to 20; the iodine number here indicates the quantity of iodine, in grams, consumed in the course of addition onto the double bond per 100 grams of the material to be analyzed.

The organopolysiloxanes (B) can be previously known linear, branched or cyclic organopolysiloxanes which contain Si-bonded hydrogen.

As organopolysiloxanes (B) it is preferred to employ linear, cyclic or branched organopolysiloxanes comprising units of the formula

$$R^8_c H_d SiO \frac{4-c-d}{2} \quad (VI)$$

where $R^8$ is identical or different and has a meaning given above for R6, c is 0, 1, 2 or 3, and d is 0, 1 or 2, with the proviso that the sum of c+d is less than or equal to 3 and on average at least two Si-bonded hydrogen atoms are present per molecule.

Although not expressed by formula (VI), up to 8% of the radicals $R^8$ in the organopolysiloxane (B) may also have the meaning of alkoxy radical.

The organopolysiloxanes (B) possess an average viscosity of preferably from 5 to 1000 $mm^2/s$, more preferably from 10 to 500 $mm^2/s$, at 25° C.

Preferably, at least 50% of all SiC-bonded radicals of organopolysiloxane (B) are methyl radicals.

The organopolysiloxane (B) employed in accordance with the invention preferably contains on average per molecule at least 3 Si-bonded hydrogen atoms.

The organopolysiloxane (B) employed in accordance with the invention contains Si-bonded hydrogen preferably in the range from 0.1% to 2% by weight, more preferably from 0.8% to 1.7% by weight, based on the overall weight of the organopolysiloxane (B).

In the compositions according to the invention, siloxane (B) is preferably employed in quantities of from 0.7 to 5 mole of Si-bonded hydrogen, more preferably from 1.1 to 3 mole of Si-bonded hydrogen, based on 1 mole of terminal aliphatic carbon-carbon double bond of siloxane (A).

The organopolysiloxane resin solutions employed in the compositions according to the invention as component (C) preferably have a content of organopolysiloxane resin from 50% to 90% by weight.

In the compositions according to the invention, organopolysiloxane resin solution (C) is preferably employed in quantities of from 0.5% to 95% by weight, more preferably from 1% to 90% by weight, based on the overall weight of the composition according to the invention.

It is possible to regulate the release properties of the crosslinkable composition by the quantity of organopolysiloxane resin in the form of the component (C) employed. Thus, as the quantity of organopolysiloxane resin increases, the release values rise.

As catalyst (D) which promotes the addition of Si-bonded hydrogen onto aliphatic double bond, it is possible to use the same catalysts which have been employed in previously known compositions for the crosslinking of organopolysiloxanes containing aliphatic double bonds with compounds containing Si-bonded hydrogen, in order to promote crosslinking. Preference is given to the use of platinum metals or compounds and/or complexes thereof, especially platinum compounds or platinum complexes.

Examples of catalysts (D) are compounds or complexes of platinum, such as platinum halides, e.g., $PtCl_4$, $H_2PtCl_6 \cdot 6H_2O$, $Na_2PtCl_4 \cdot 4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, especially platinum-1,3-divinyl-1,1,3,3-tetramethyldisiloxane complexes, bis(divinyl-1,1,3,3-tetra-methyldisiloxane complexes, bis(γ-picoline)-platinum dichloride, trimethyl lenedipyridine platinum dichloride, dicyclopentadieneplatinum dichloride, dimethyl sulfoxide-ethyleneplatinum(II) dichloride, reaction products of platinum tetrachloride with olefin and primary amine or secondary amine or primary and secondary amine, such as the reaction product of platinum tetrachloride, dissolved in 1-octene, with secbutylamine, cyclooctadieneplatinum dichloride and norbomadiene-platinum dichloride.

In the compositions according to the invention, catalyst (D) is preferably employed in quantities of from 10 to 1000 ppm (parts per million) by weight, more preferably from 50 to 200 ppm by weight, based on the overall weight of composition according to the invention and calculated as elemental platinum.

Examples of the inhibitors (E) which delay the addition of Si-bonded hydrogen onto aliphatic multiple bond, the inhibitors, are alkynols, fumaric acid, maleic acid, fumarates and maleates.

In the compositions according to the invention, inhibitor (E) is preferably employed in quantities of from 0.05% to 2% by weight, more preferably from 0.1% to 1.0% by weight, based on the overall weight of composition.

In addition, the crosslinkable organopolysiloxane compositions may contain customary additives.

The crosslinkable organopolysiloxane compositions can be prepared by known processes such as simple mixing of the individual components.

Advantageously, the organopolysiloxane resin solutions (C) according to the invention are in a mixture with inhibitor (E) and, optionally, organopolysiloxane are employed as release additives.

The present invention also provides release additives comprising organopolysiloxane resin solution (C) according to the invention or prepared in accordance with the invention, compound (E) which delays the addition of Si-bonded hydrogen onto aliphatic double bond and, optionally, organopolysiloxane selected from the group consisting of organopolysiloxane with SiC-bonded organic radicals containing terminal aliphatic carbon-carbon double bond and organopolysiloxane containing Si-bonded hydrogen.

The release additives according to the invention contain inhibitor (E) in quantities of preferably from 0.1% to 1.5% by weight, more preferably from 0.1% to 1.0% by weight, based on the weight of the resin solution (C).

If the release additives according to the invention contain organopolysiloxanes, they are preferably siloxanes comprising units of the formula (V) having a viscosity of from 30 to 100,000 $mm^{2/}$ s, with particular preference being given to polydimethylsiloxanes having terminal vinyl groups in the viscosity range mentioned.

If the release additives according to the invention contain organopolysiloxanes, the quantities involved are preferably from 1% to 40% by weight, more preferably from 2% to 30% by weight, based on the weight of the resin solution (C).

Preferably, the release additives according to the invention contain, in addition to resin solution (C), inhibitor (E) and, optionally, organopolysiloxane, no further components.

The release additives according to the invention can then be mixed in a known manner with the other components (A), (B) and (D) for the preparation of crosslinkable organopolysiloxane compositions from which it is possible to produce coatings which repel tacky substances.

The crosslinkable organopolysiloxane compositions according to the invention can be employed for all purposes for which addition-crosslinkable organopolysiloxane compositions have also been employed hitherto, such as, for example, for the production of release coatings against adhering articles. Thus they are suitable, for example, for the production of release, backing and interleaving papers, including interleaving and release papers which are employed in the production of, for example, cast film or decorative film or of foams, including those made from polyurethane. The compositions according to the invention are also suitable, for example, for the production of release, backing and interleaving cards, films and cloths, for treating the reverse faces of self-adhesive tapes or self-adhesive films or the written faces of self-adhesive labels. The compositions according to the invention are suitable, in addition, for treating packaging material, such as that comprising paper, cardboard boxes, metal foils and drums, for example cardboard, plastic, wood or iron, which is or are intended for the storage and/or transportation of tacky goods, such as adhesives, sticky foodstuffs, for example cakes, honey, candies and meat, bitumen, asphalt, greased materials and crude rubber. A further example of the use of the compositions according to the invention is the treatment of supports for the transfer of contact adhesive layers in the so-called transfer process.

The compositions according to the invention are suitable for the production of the self-adhesive materials connected to the release paper, both by the off-line method and by the in-line method.

The compositions according to the invention may be applied to the surfaces to be rendered repellent to tacky substances in any desired manner which is suitable for the production of coatings of liquid substances, many of which ways are known, for example by dipping, brushing, flow-coating, spraying, rolling or printing, for example by means of an offset gravure coating apparatus, by knife or doctor-blade coating or using an air brush.

The surfaces which are to be rendered repellent to tacky substances and which can be treated within the scope of the invention may be surfaces of any substances which are solid at room temperature and at from 900 to 1100 hPa. Examples of such surfaces are those of paper, wood, cork and polymer films, for example polyethylene films or polypropylene films, woven and nonwoven cloth of natural or synthetic fibers or glass fibers, ceramic articles, glass, metals, polyethylene-coated paper, and boards, including those of asbestos. The polyethylene mentioned above may in each case be high-pressure, medium-pressure or low-pressure polyethylene. The paper may comprise low-grade papers, such as absorbent papers, including raw—i.e., not pretreated with chemicals and/or with polymeric natural substances—kraft paper having a weight of from 60 to 150 g/m2, unsized papers, papers of low freeness value, mechanical papers, unglazed or uncalendered papers, papers which are smooth on one side owing to the use of a dry glazing cylinder during their production, without additional complex measures, and are therefore referred to as "machine-glazed papers", uncoated papers or papers produced from waste paper, i.e., so-called recycled papers. The paper to be treated in accordance with the invention may, however, also comprise high-grade papers, such as low-absorbency papers, sized papers, papers of high freeness value, chemical papers, calendered or glazed papers, glassine papers, parchmentized papers or precoated papers. Cards and boards may also be of low or high grade.

The crosslinkable organopolysiloxane compositions according to the invention can be crosslinked in a manner which is known, during which the terminally unsaturated aliphatic hydrocarbon of component (C) employed in accordance with the invention is incorporated chemically into the silicone matrix.

The compositions according to the invention are preferably crosslinked at from 50° C. to 200° C., more preferably at from 60° to 150° C., and at a pressure from 900 to 1100 hPa.

For crosslinking by heating, energy sources used are preferably ovens, for example convection ovens, heating tunnels, heated rollers, heated plates or heat rays in the infrared region.

The compositions according to the invention have the advantage that they are free from aromatic hydrocarbons, thereby making it possible to avoid unwanted emissions in the course of the above-mentioned utilities, especially at relatively high temperatures. The compositions according to the invention have the additional advantage that they are highly stable and give coatings having reproducible release values.

In the examples which follow, all parts and percentages are by eight, unless stated otherwise. The examples below, unless indicated otherwise, are carried out at the pressure of the surrounding atmosphere, i.e., at about 1000 hPa, and at room temperature, i.e., at about 20° C., or at the temperature which is established when the reactants are combined at room temperture without additional heating or cooling. All viscosity data given in the examples are intended to relate to a temperature of 25° C.

Example 1

420 g of water and 3.8 g of 20% hydrochloric acid are added to 1800 g of tetraethoxysilane having a 40% $SiO_2$ content (commercially available under the designation TES 40 from Wacker-Chemie GmbH, Munich), 730 g of hexamethyldisiloxane and 116 g of 1,3-divinyltetramethyldisiloxane, and the mixture is heated at reflux at a temperature of 78° C. for a duration of 2.5 hours. Subsequently, 970 g of distillate are taken off over the course of one hour. The distillate obtained contains 10% water and 90% ethanol. 990 g of 1-dodecene (commercially available from Chevron Chemical Houston, Geneva) and 8 g of a 25% strength solution of NaOH in water are added to the homogeneous reaction mixture, and 560 g of volatile constituents are distilled off. The distillate obtained consists 56% of ethanol, 42% of water and 2% of 1-dodecene. Subsequently the homogeneous reaction mixture is neutralized with 5 ml of 20% strength hydrochloric acid, and 15 g of volatile constituents are distilled off. This distillate contains 61% ethanol, 27% water and 12% 1-dodecene. The completely precipitated sodium chloride is then filtered off.

The resin solution thus obtained is concentrated in a further process step by distillative removal of 568 g of volatile constituents at a temperature of 130° C. and at a pressure of 30 hPa. The distillate obtained consists 1% of ethanol and 99% of 1-dodecene, which can be reused in the production of the resin solution.

1745 g of an organopolysiloxane resin solution are obtained having a resin content of 78% and a viscosity of 767 $mm^{2}$/s. After storage for a period of 2 months at 25° C., there is no change in the viscosity of the resin solution.

$^{1}$H-NMR measurements demonstrate that, during the production of the resin, there is no isomerization of the terminal carbon-carbon double bond in the 1-dodecene. No —CH=CH— units are detected.

If the resin solution obtained is diluted with 1-dodecene to a resin content of 50%, then the resulting solution has a viscosity of 7.8 mm²/s and a content of Si-bonded hydroxyl groups of 0.09% and a residual acid content of 3 ppm.

Comparison Example 1

500 g of a solution, prepared in accordance with the procedure described in Example 3 of the above-mentioned publication DE 42 16 139 A using the proportions of starting substances indicated in Example 1 according to the invention, of the MQ resin comprising [Me$_3$SiO$_{1/2}$],[(CH$_2$=CH)Me$_2$SiO$_{1/2}$] and [SiO$_{4/2}$] units, where Me is the methyl radical, in toluene, having a solids content of 70%, are mixed with 100 g of 1-dedecene, and 152 g of volatile constituents are distilled off at a temperature of 75° C. and at a pressure of 30 hPa. The residue obtained comprises 448 g of a 78% strength solution of MQ resin in 1-dodecene, with a residual toluene content of 0.9% (determined by $^1$H-NMR measurements) and a viscosity of 721 mm²/s.

Example 2

The 78% strength organopolysiloxane resin solution prepared in Example 1 is used to produce a coating compositions by mixing the following substances:

70 parts of the 78% strength resin solution of Example 1, 20 parts of an α,ω-dimethylvinylsiloxypolydimethylsiloxane having a viscosity of 500 mm²/s, 10 parts of an α,ω-dimethylvinylsiloxypolydimethylsiloxane having a viscosity of 20,000 mm²/s, 5.3 parts of an α,ω-trimethylsiloxypolymethylhydridosiloxane having a viscosity of 25 mm²/s and a content of Si-bonded hydrogen of 1.62%, 0.25 parts of ethinylcyclohexanol, and platinum in the form of a platinum,1,3-divinyl-1,1,3,3-tetramethyldisiloxane complex in a quantity such that the overall mixture has a platinum content of 100 ppm, based on elemental platinum.

The mixture prepared in this way is coated onto 65 g/m² glassine paper using a metalic drawing rod, a so-called manual doctor knife, so that the applied weight is 1.5 g/m².

The paper thus coated is then cured at 150° C. for 12 seconds in a convection oven. One section of the coated paper is then covered with the rubber adhesives of designations "T-4154" and "K-7476" and the acrylic adhesive of designation "A-7475" (each commercially available from Beiersdorf, Hamburg, Germany). The laminates are subsequently aged and tested in accordance with FINAT Test No. 10. The results can be sew in Table 1.

TABLE 1

| Adhesive | "T-4154" | "K-7476" | "A-7475" |
|---|---|---|---|
| Release values [cN/cm*] | 109 | 290 | 192 |

Comparison Example 2

The procedure described in Example 2 is repeated with the modification that, to produce the coating composition, 70 parts of the 78% strength resin solution of Comparison Example 1 are employed instead of 70 parts of the 78% strength resin solution of Example 1. The results can be seen in Table 2.

TABLE 2

| Adhesive | "T-4154" | "K-7476" | "A-7475" |
|---|---|---|---|
| Release values [cN/cm*] | 111 | 287 | 199 |

In the course of curing of the coating composition, toluene is released.

Example 3

The 78% strength resin solution produced in accordance with Example 1 is blended in a weight ratio of 1:1 with an α, ω-dimethylvinylsiloxypolydimethylsiloxane having a viscosity of 500 mm²/s. Even after storage for several days at 25° C. and at the pressure of the surrounding atmosphere, the mixture remains completely clear and homogeneous; no cloudiness can be determined.

What is claimed is:

1. A crosslinkable organopolysiloxane composition which comprises
    (A) an organopolysiloxane having SiC-bonded organic radicals with a terminal aliphatic carbon-carbon double bond,
    (B) an organopolysiloxane having Si-bonded hydrogen,
    (C) an organopolysiloxane resin solution free of aromatic hydrocarbons, comprising
        i. an organpolysiloxane resin having less than 6 mol percent Si-bonded alkoxy and having less than 0.4 weight percent hydroxy groups, and
        ii. an aliphatic hydrocarbon having terminal unsaturation,
    (D) a metal complex or metal compound of subgroup VIII, and optionally,
    (E) a compound which delays the addition of Si-bonded hydrogen onto an aliphatic double bond.

2. A release additive for a crosslinkable organopolysiloxane composition comprising an organopolysiloxane resin solution (C) as claimed in claim 1, a compound (E) which delays the addition of Si-bonded hydrogen onto aliphatic double bond and, optionally, organopolysiloxanes selected from the group consisting of organopolysiloxane with SiC-bonded organic radicals containing terminal aliphatic carbon-carbon double bond and organopolysiloxane containing Si-bonded hydrogen.

3. A crosslinkable organopolysiloxane composition as claimed in claim 1, wherein organopolysiloxane (A) is comprised of units of the formula

$$R^6_e R^7_f SiO \frac{4-e-f}{2} \qquad (V)$$

where
R$^6$ is identical or different and is an aliphatically saturated, optionally, substituted SiC-bonded hydrocarbon having 1 to 18 carbon atoms,
R$^7$ is identical or different and is an SiC-bonded organic radical with a terminal aliphatic carbon-carbon double bond,
e is 0, 1, 2 or 3 and
f is 0, 1, 2 or 3,
with the proviso that the sum of e+f is less than or equal to 3 and there are at least two radicals R$^7$ present per organopolysiloxane (A).

4. A crosslinkable organopolysiloxane composition as claimed in claim 3, wherein organopolysiloxane (A) is comprised of a polydimethylsiloxane having dimethylvinyl end groups.

5. The crosslinkable organopolysiloxane composition as claimed in claim 1, wherein the organopolysiloxane (B) is comprised of units of the formula $$R^8{}_c H_d SiO \frac{4-c-d}{2} \qquad (VI)$$

where
$R^8$ is identical or different and has the meaning given for $R^6$
c is 0, 1, 2 or 3, and
d is 0, 1 or 2,
with the proviso that the sum of c+d is less than or equal to 3 and there are at least two Si-bonded hydrogen atoms per organopolysiloxane (B).

6. The crosslinkable organopolysiloxane composition as claimed in claim 1, wherein the organopolysiloxane resin solution (C) has an organopolysiloxane resin content of from 50% to 90% by weight.

7. The crosslinkable organopolysiloxane composition as claimed in claim 1, wherein the organopolysiloxane resin solution (C) is present in amounts of from 0.5% to 95% by weight based on the total weight of the crosslinkable organopolysiloxane composition.

8. A crosslinkable organopolysiloxane composition as claimed in claim 1 wherein the terminally unsaturated aliphatic hydrocarbon is a 1-alkene having from 10 to 18 carbons.

9. The release additive as claimed in claim 2, wherein inhibitor (E) is present in amounts of from 0.1% to 1.5% based on the weight of the organopolysiloxane resin solution (C).

* * * * *